US010120718B2

(12) United States Patent
Esterkin et al.

(10) Patent No.: US 10,120,718 B2
(45) Date of Patent: Nov. 6, 2018

(54) RESERVATION OF HARDWARE RESOURCES IN A COMPUTER SYSTEM BASED ON UTILIZATION MEASUREMENTS DURING TIME RANGES (71) Applicant: CA, Inc., New York, NY (US)

(72) Inventors: Alex Esterkin, Revere, MA (US); David Rich, Ayer, MA (US); James Mercer, Millville, MA (US)

(73) Assignee: CA, Inc., New York, NY (US)

( * ) Notice: Subject to any disclaimer, the term of this patent is extended or adjusted under 35 U.S.C. 154(b) by 164 days.

(21) Appl. No.: 15/245,907

(22) Filed: Aug. 24, 2016

(65) Prior Publication Data

US 2018/0060127 A1  Mar. 1, 2018

(51) Int. Cl.
*G06F 9/50* (2006.01)
*G06F 1/32* (2006.01)
*G06F 11/30* (2006.01)

(52) U.S. Cl.
CPC .......... *G06F 9/5011* (2013.01); *G06F 1/3287* (2013.01); *G06F 11/302* (2013.01)

(58) Field of Classification Search
CPC ..... G06F 9/5011; G06F 1/3287; G06F 11/302
See application file for complete search history.

(56) References Cited

U.S. PATENT DOCUMENTS 7,292,531 B1 * 11/2007 Hill ..................... H04L 41/0896 370/230.1
9,886,845 B2 * 2/2018 Rhoads ............. G06F 17/30241
2008/0120129 A1 * 5/2008 Seubert .................. G06Q 10/06 705/35
2011/0212717 A1 * 9/2011 Rhoads ............. G06F 17/30241 455/420
2012/0182865 A1 * 7/2012 Andersen .................. H04L 1/22 370/228
2014/0080428 A1 * 3/2014 Rhoads .................... H04W 4/70 455/88
2014/0279526 A1 * 9/2014 Jackson ............... G06Q 20/405 705/44
2016/0224951 A1 * 8/2016 Hoffberg .............. G06Q 20/401
2017/0236407 A1 * 8/2017 Rhoads .................. G08C 17/02 455/420

* cited by examiner

*Primary Examiner* — Davoud A Zand
(74) *Attorney, Agent, or Firm* — Sage Patent Group (57) ABSTRACT

A resource management computer node obtains hardware utilization values measured for a hardware resource of a computer system being used by a software application. For a set of the utilization values that were measured during a same time-of-day range on a same day of week, the node determines a count value indicating a number of times the utilization values in the set exceed a count threshold, determines a count percentage based on a ratio of the count value to a sum of count values determined for the same day of week, compares the count percentage to a busy threshold, and, responsive to if the count percentage is determined to exceed the busy threshold, sets a busy indicator object at a location in a resource utilization data structure having a defined correspondence to the time-of-day range. The node controls reservation of hardware resources for the software application responsive to whether the busy indicator object has been set.

19 Claims, 7 Drawing Sheets

RESERVATION OF HARDWARE RESOURCES IN A COMPUTER SYSTEM BASED ON UTILIZATION MEASUREMENTS DURING TIME RANGES

BACKGROUND

The present disclosure relates to controlling start-up and/or power mode switching of hardware resources and to constraining what processing resources, memory resources, and communication resources among the hardware resources within a distributed computing system can be used by software applications.

Distributed computing systems, sometimes also referred to as cloud computing systems, are used to provide services to electronic devices which may be operated by end users. In a cloud computing system, the hardware resource architecture is hidden from the end user. The hardware resource architecture can include computer servers, network non-volatile storage devices, computing devices, network routers, network gateways, wireless/wired network interface circuits, etc. However, because services are deployed on a hardware resource architecture which is hidden from end users, it can be managed, upgraded, replaced or otherwise changed by a system administrator (operator) without the end users being aware of or affected by the change.

In existing cloud and other distributed computing systems, the creator of services or the operator of the cloud system must know in advance which software applications (or types of software applications) need to be deployed and estimate the number and types of physical hardware resources to support processing of the software applications. The capacity of the distributed computer system can be changed by increasing or decreasing the number and/or types of physical hardware resources that are reserved for use by the software applications. During operation, a load balancer can operate to direct requests from user electronic devices to particular ones of the physical hardware resources for processing by associated applications. Although load balancers can provide better balancing of system utilization, they may not sufficiently improve the efficiency at which physical hardware resources are deployed and used, which may have a substantial effect on cost in view of the potential large number of physical hardware resources and software applications that can be deployed in some distributed computer systems.

SUMMARY

Some embodiments disclosed herein are directed to a method performed by a resource management computer node. The method includes obtaining hardware utilization values measured for a hardware resource of a computer system being used by a software application. For a set of the hardware utilization values that were measured during a same time-of-day range on a same day of week, the resource management computer node determines a count value indicating a number of times the hardware utilization values in the set exceed a count threshold value, determines a count percentage value based on a ratio of the count value to a sum of count values determined for the same day of week, compares the count percentage value to a busy threshold value, and, responsive to if the count percentage value is determined to exceed the busy threshold value, sets a busy indicator object at a location in a resource utilization data structure having a defined correspondence to the time-of-day range. Reservation of hardware resources for operational use by the software application during at least the time-of-day range is controlled responsive to whether the busy indicator object has been set at the location in the resource utilization data structure.

Some other embodiments disclosed herein are directed to a resource management computer node having a network interface circuit configured to communicate with hardware resources of a computer system, a processor circuit, and a memory circuit coupled to the processor circuit. The memory circuit stores program code which when executed by the processor circuit causes the processor circuit to perform operations. The operations include obtaining hardware utilization values measured for a hardware resource of a computer system being used by a software application. For a set of the hardware utilization values that were measured during a same time-of-day range on a same day of week, the operations further include determining a count value indicating a number of times the hardware utilization values in the set exceed a count threshold value, determining a count percentage value based on a ratio of the count value to a sum of count values determined for the same day of week, comparing the count percentage value to a busy threshold value, and, responsive to if the count percentage value is determined to exceed the busy threshold value, setting a busy indicator object at a location in a resource utilization data structure having a defined correspondence to the time-of-day range. The operations further include controlling reservation of the hardware resources for operational use by the software application during at least the time-of-day range responsive to whether the busy indicator object has been set at the location in the resource utilization data structure.

Other methods, resource management computer nodes, and/or computer program products according to embodiments will be or become apparent to one with skill in the art upon review of the following drawings and detailed description. It is intended that all such additional methods, resource management computer nodes, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Figure 1:
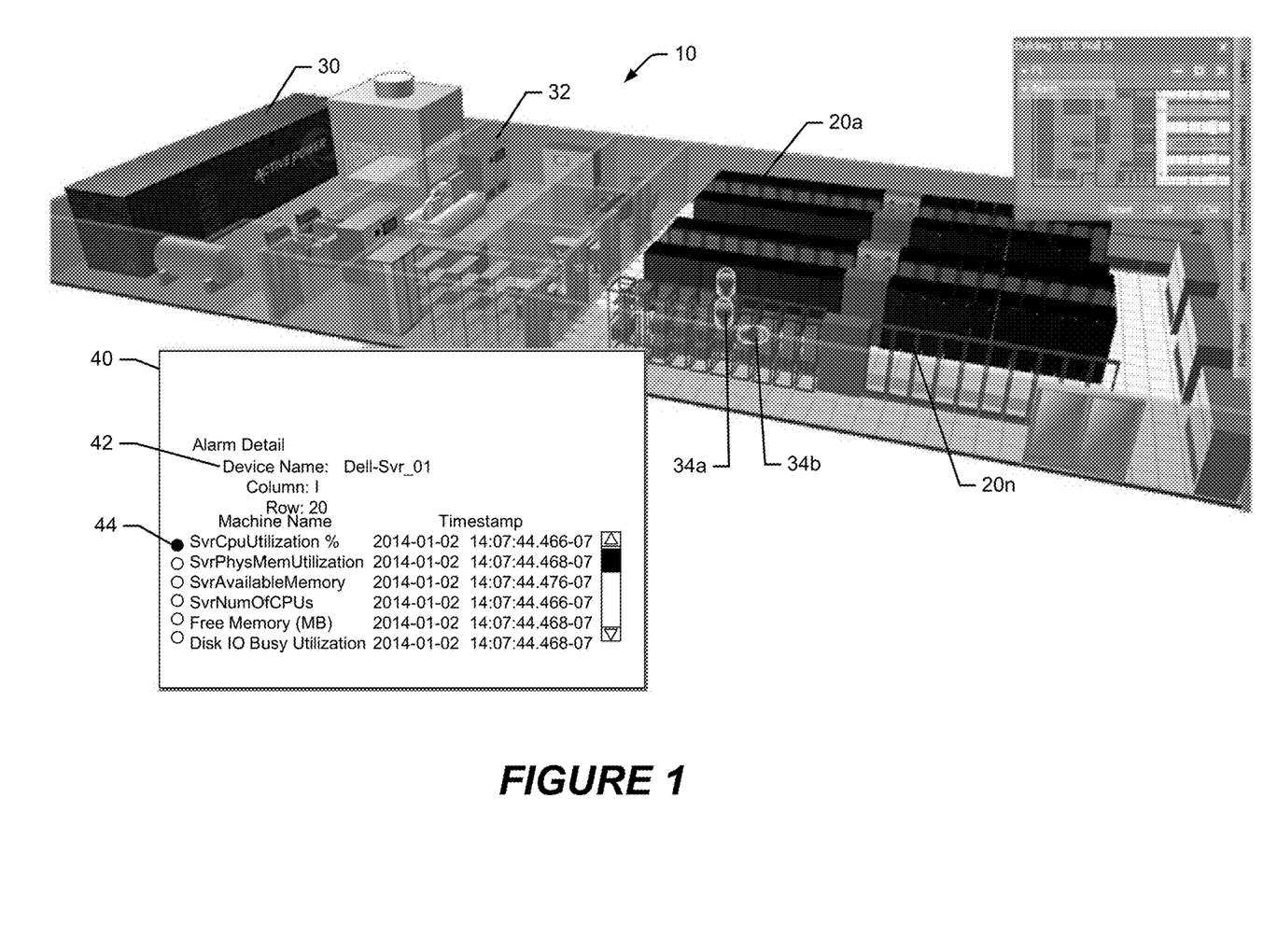
FIG. 1 is a pictorial illustration of a distributed computer system that is configured as a data center and has a resource management computer node configured according to some embodiments.

FIG. 1 is a block diagram of a distributed computer system that is configured as a data center 10 according to some embodiments. The data center 10 can include hundreds or thousands of data servers which are mounted to physical racks 20a-20n arranged in rows for accessibility by operators. The data servers consume substantial amounts of electrical power from a power source 30, occupy significant amount of physical rack storage space of the data center 10, and require substantial cooling heat transfer by a cooling system 32 to remain within an acceptable operational temperature range. The electrical power, physical rack storage space, cooling, and other support systems are examples of infrastructure provided by the data center 10 to support operation of the data servers. In accordance with some embodiments, the data center 10 includes a resource management computer node, which can also be mounted within one or more of the physical racks 20 or separate therefrom, and can operate according to various embodiments disclosed herein.

The data servers and associated network communication devices are example hardware resources of the data center 10 or other computer system for processing software applications. In some embodiments, the data center 10 contains physical host machines (hardware resources) and provide a plurality of guest virtual machines (VMs) within a plurality of VM clusters. Each VM cluster can include a plurality of guest VMs, and each VM cluster can reside on different data servers (or other hardware resources) or may be distributed across more than one data server.

In accordance with some embodiments, the resource management computer node obtains hardware utilization values measured for a hardware resource of the data center 10 (or other computer system) being used by a software application. For a set of the hardware utilization values that were measured during a same time-of-day range on a same day of week, the resource management computer node determines a count value indicating a number of times the hardware utilization values in the set exceed a count threshold value, and determines a count percentage value based on a ratio of the count value to a sum of count values determined for the same day of week, compares the count percentage value to a busy threshold value. Responsive to if the count percentage value is determined to exceed the busy threshold value, a busy indicator object is set (e.g., stored as a defined logical value) at a location in a resource utilization data structure having a defined correspondence to the time-of-day range. The resource management computer node controls reservation of hardware resources for operational use by the software application during at least the time-of-day range responsive to whether the busy indicator object has been set at the location in the resource utilization data structure.

The resource management computer node may display reports indicating the hardware utilization values measured for hardware resources. The reports may alternatively or additionally indicate what hardware resources are being reserved for operational use by identified software applications.

In FIG. 1, a report 40 is displayed on a display device of a data center terminal. The report 40 identifies the name 42 of one of the hardware resources (e., data server "Dell-Srv_01") identifies hardware utilization values that have been measured for that hardware resource while processing a software application. The hardware utilization values displayed in the example report 40 of FIG. 1 include server CPU utilization percentage, server physical memory utilization, server available memory, server number of CPUs, free memory, and/or disk input/output busy utilization. The report may further indicate if any of the resources are operating near defined limits.

A pictorial illustration of the data center 10 may also be displayed. The resource management computer node may display graphical alarm indications 34a and 34b at particular locations of the racks where the data center operator may want to deploy further server devices or other hardware resources based on information provided by the resource management computer node according to one or more embodiments disclosed herein.

These and other operations are explained in further detail below after the following explanation of an example computer resource node and distributed computing system in which the operations may be performed.

Computer Resource Node of a Distributed Computing System

Figure 2:
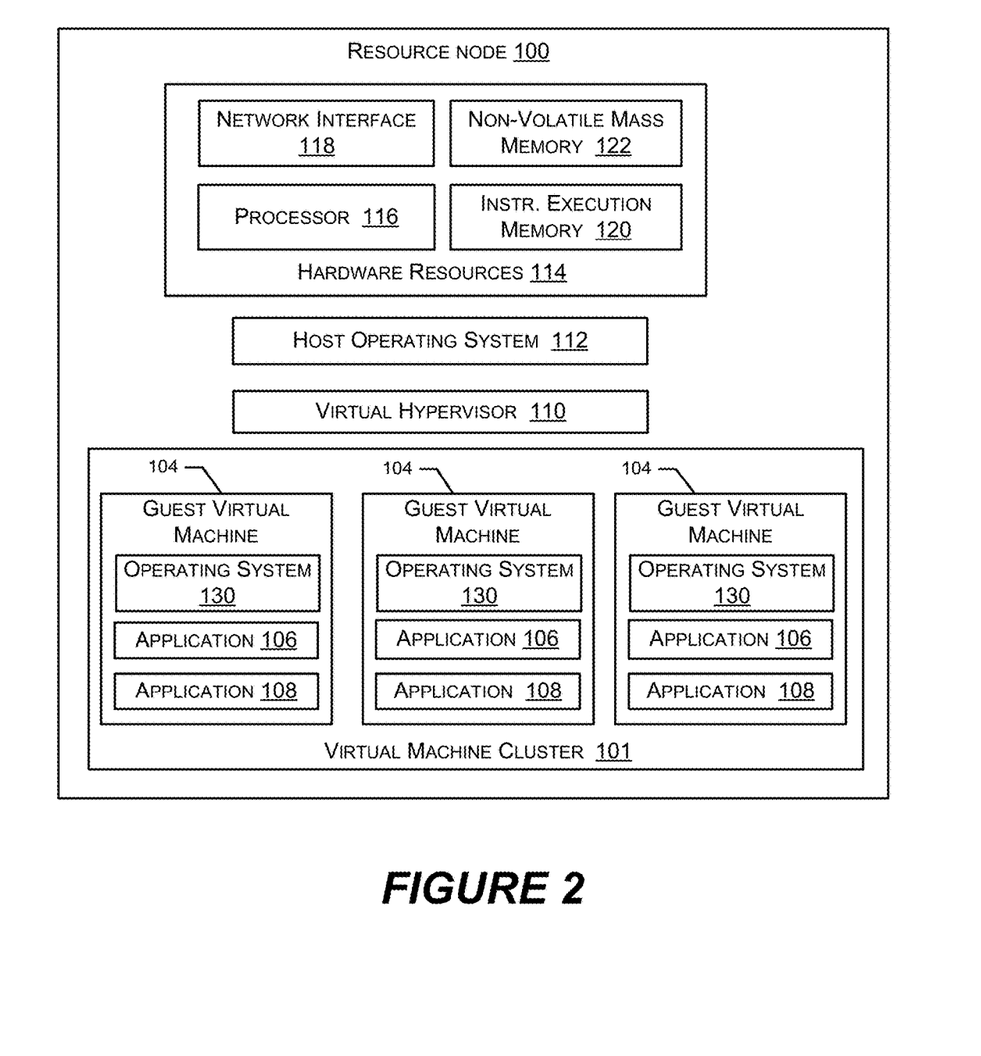
FIG. 2 is a block diagram of a resource node, used in a distributed computing system, that is configured according to some embodiments.

FIG. 2 is a block diagram of a computer resource node 100 of a distributed computing system that is configured according to some embodiments. Referring to FIG. 2, the resource node 100 includes a hardware resources 114 that performs computer operations to provide one or more VM clusters 101. Each of the VM clusters includes a plurality of guest VMs 104. Each guest VM 104 runs a guest operating system 130 and a plurality of applications 106 and 108. The computing needs of users 102 (e.g., humans and/or other virtual/non-virtual machines) drive the functionality of the VM cluster 101 and guest VMs 104 thereof. A virtual hypervisor 110 can provide an interface between the VM cluster 101 and a host operating system 112 and allows multiple guest operating systems 130 and associated applications 106 and 108 to run concurrently. The host operating system 112 is responsible for the management and coordination of activities and the sharing of the computer resources of the hardware resources 114.

The hardware resources 114 may include, without limitation, network content computer servers (e.g., Internet website servers, movie/television programming streaming servers, application program servers), network storage devices (e.g., cloud data storage servers), network data routers, network gateways, communication interfaces, program code processors, data memories, display devices, and/or peripheral devices. The hardware resources 114 may include software application computing resources such as: processor(s) 116 (e.g., central processing unit, CPU); network interface(s) 118; memory device(s) 120; data mass storage device(s) 122 (e.g., disk drives, solid state nonvolatile memory, etc.); etc. The processor(s) 116 is configured to execute software application program (instruction) code from the memory device(s) 120, described below as a computer readable storage medium, to perform at least some of the operations disclosed herein.

Besides acting as a host for computing applications 106 and 108 that run on the hardware resources 114, the host operating system 112 may operate at the highest priority level of the resource node 100, executing instructions associated with the hardware resources 114, and it may have exclusive privileged access to the hardware resources 114. The host operating system 112 creates an environment for implementing the VM cluster 101 which hosts the guest VMs 104. One host operating system 112 is capable of implementing multiple independently operating VM clusters 101 simultaneously.

The virtual hypervisor 110 (which may also be known as a virtual machine monitor or VMM) runs on the host operating system 112 and provides an interface between the VM clusters 101 and the hardware resources 114 through the host operating system 112. The virtual hypervisor 110 virtualizes the computer system resources and facilitates the operation of the host guest VMs 104 and associated VM cluster 101. The virtual hypervisor 110 may provide the illusion of operating at a highest priority level to the guest operating system 130. However, the virtual hypervisor 110 can map the guest operating system's priority level to a priority level lower than a top most priority level. As a result, the virtual hypervisor 110 can intercept the guest operating system 130 operations, and execute instructions that require virtualization assistance. Alternatively, the virtual hypervisor 110 may indirectly emulate or directly execute the instructions on behalf of the guest operating system 130. Software steps permitting indirect interaction between the guest operating system 130 and the hardware resources 114 can also be performed by the virtual hypervisor 110.

The VMs 104 present a virtualized environment to the guest operating systems 130, which in turn provide an operating environment for the applications 106 and 108, and other software constructs.

Distributed Computing System

Figure 3:
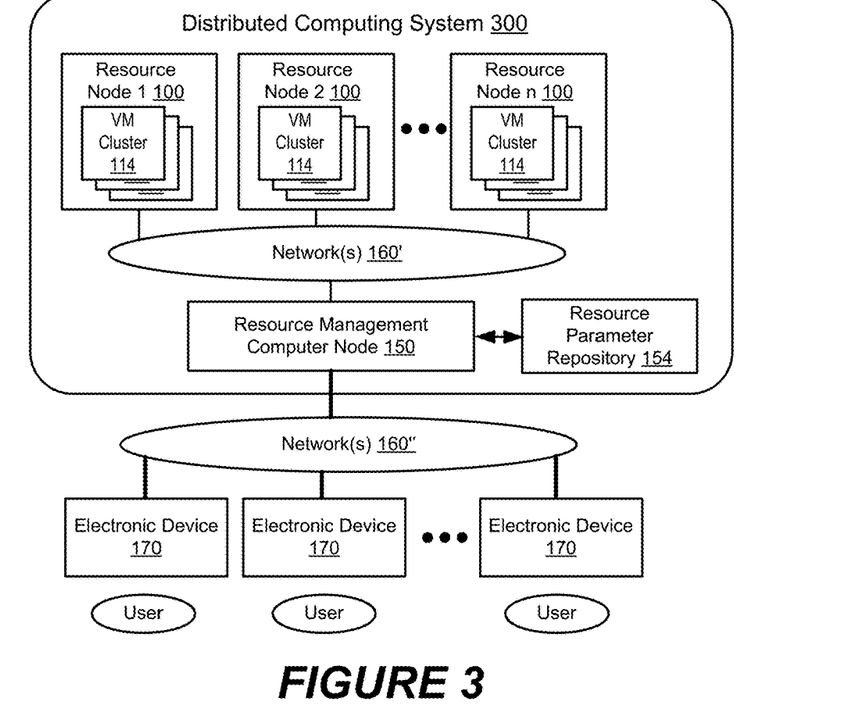
FIG. 3 is a block diagram of a distributed computing system that is configured according to some embodiments.

FIG. 3 is a block diagram of a distributed computing system 300 that is configured according to some embodiments. Referring to FIG. 3, the distributed computing system 300 receives requests from electronic devices 170a-170n via one or more networks 160'-160" for processing. The electronic devices 170a-170n may be operated by end-users. The distributed computing system 300 includes a plurality of resource nodes 100 and a resource management computer node 150. The electronic devices 170a-170n may include, but are not limited to, desktop computers, laptop computers, tablet computers, wireless mobile terminals (e.g., smart phones), gaming consoles, networked televisions with on-demand media request capability. The resource nodes 100 may be configured as described herein regarding FIG. 2, or may correspond to a non-virtualized configuration of FIG. 2 in which the hardware resources 114 of FIG. 2 processing the various software application 106-108 and operating system 130 without use of a virtual hypervisor 110 and guest virtual machine 104 configuration. For some distributed computing systems 300, the number of resource nodes 100 can number more than a hundred or thousand and the number of electronic devices 170 can number more than a thousand or hundred thousand.

The resource management computer node 150 may operate to distribute individual requests that are received from the electronic devices 170a-n to particular ones of the resource nodes 100 selected for processing. The resource management computer node 150 may select among the resource nodes 100 and/or software applications hosted on VM clusters 101 (or hardware resources 114) of the resource nodes 100 for distributing individual requests responsive to the present loading of the resource nodes 110 and/or the VM clusters 101 (or hardware resources 114). The loading may be determined based on the hardware utilization values measured for a hardware resource of a computer system being used by a software application, which may include processing resources, volatile memory resources, non-volatile mass storage resources, communication resources, and/or application resources that are utilized to process the requests. The resource management computer node 150 may, for example, operate to distribute the requests responsive to whether the busy indicator object has been set at the location in the resource utilization data structure as described herein according to some embodiments described below and including as shown in FIGS. 5-13.

Example Resource Management Computer Node

Figure 4:
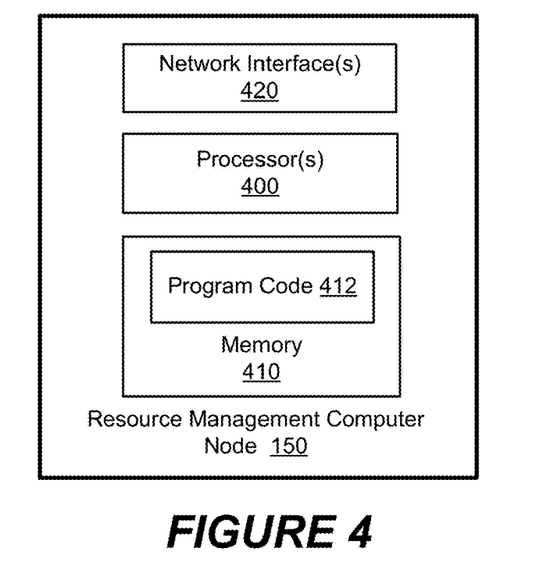
FIG. 4 is a resource management computer node that is configured according to some embodiments.

FIG. 4 is a block diagram of a resource management computer node 150 that is configured to perform the operations of one of more of the embodiments disclosed herein. The resource management computer node 150 can include one or more network interfaces 420, one or more processors 400 (referred to as "processor" for brevity), and one or more memories 410 (referred to as "memory" for brevity) containing program code 412.

The processor 400 may include one or more data processing circuits, such as a general purpose and/or special purpose processor (e.g., microprocessor and/or digital signal processor) that may be collocated or distributed across one or more networks. The processor 400 is configured to execute program code 412 in the memory 410, described below as a computer readable medium, to perform some or all of the operations for one or more of the embodiments disclosed herein.

Reservation of Hardware Resources Based on Settings of Busy Indicators

As explained above, a distributed computer system (e.g., data center 10) can include hundreds or thousands of physical host machines (e.g., data servers and other hardware resources). The physical host machines perform computer operations that process software applications. In accordance with at least some embodiments, busy indicators are selectively set (e.g., stored as defined logical values at defined locations in a resource utilization data structure) based on hardware utilization values which are measured for hardware resources that are being used by software applications. The busy indicators of the resource utilization data structure are then used to control reservation of hardware resources for operational use by software applications during at least certain time-of-day ranges.

FIGS. 5-13 are flowcharts that illustrate operations for setting busy indicator objects at location in a resource utilization data structure and controlling reservation of hardware resources for operational use by a software application responsive to the busy indicator objects, in accordance with some embodiments.

Figure 5:
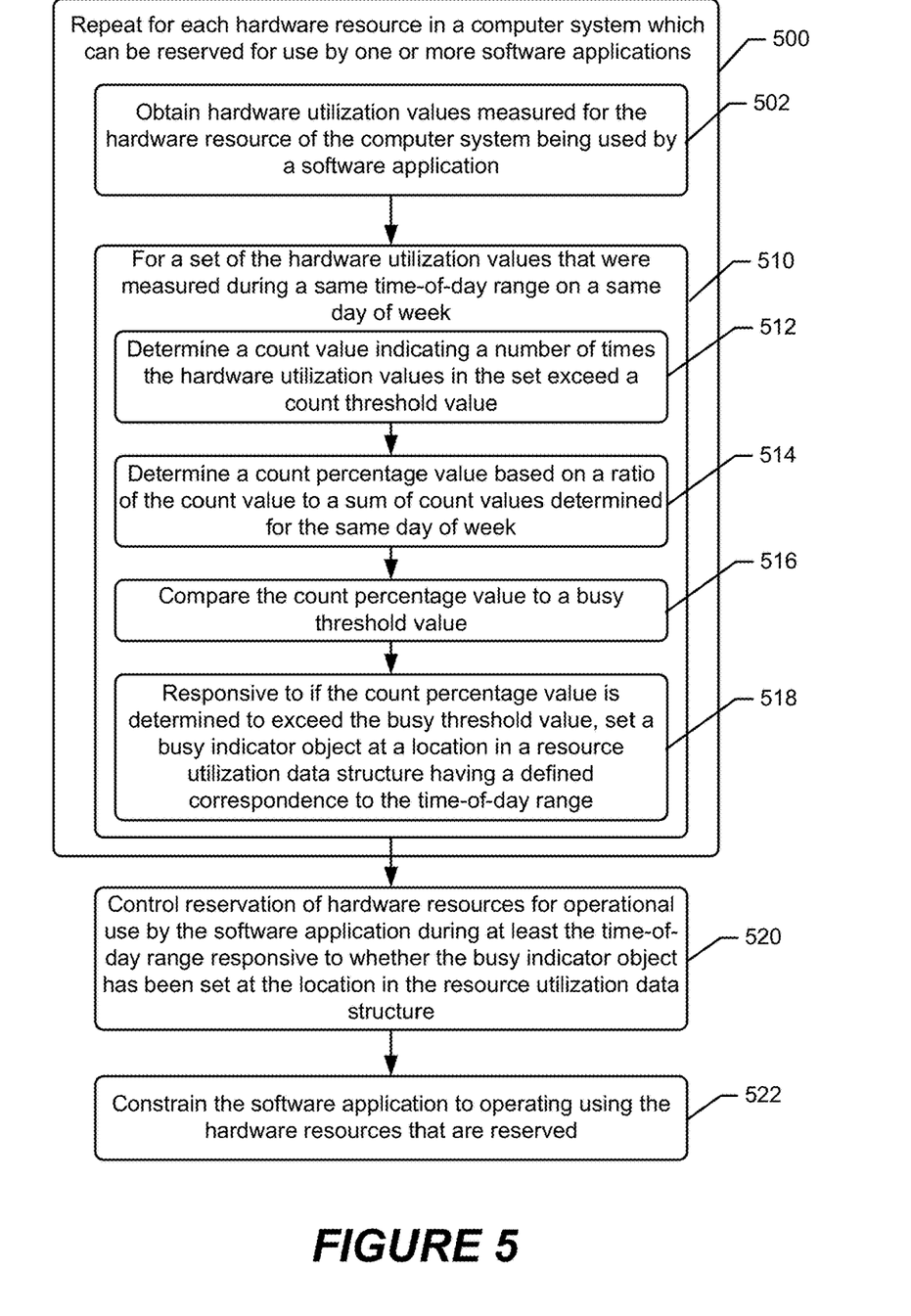
FIGS. 5-13 are flowcharts that illustrate operations for setting busy indicator objects at location in a resource utilization data structure and controlling reservation of hardware resources for operational use by a software application responsive to the busy indicator objects, in accordance with some embodiments.

Referring to FIG. 5, the resource management computer node 150 obtains (block 502) hardware utilization values that are measured for a hardware resource of a computer system being used by a software application. The hardware utilization values may be measured to indicate at least one of processor utilization, non-volatile memory device storage space utilization, and data network communication utilization. In some embodiments the resource management computer node 150 receives the hardware utilization values from a Capacity Management (CAPMAN) tool provided by CA Technologies. The hardware utilization values can be a time series stream of hardware utilization values that are observed for a defined one or more hardware resources, and may have time stamps associated therewith to allow averaging or other combining operations over one or more defined time-of-day ranges and/or other time periods.

For a set of the hardware utilization values that were measured during a same time-of-day range (block 510) on a same day of week (e.g., Monday), the resource management computer node 150 determines (block 512) a count value indicating a number of times the hardware utilization values in the set exceed a count threshold value.

Figure 6:
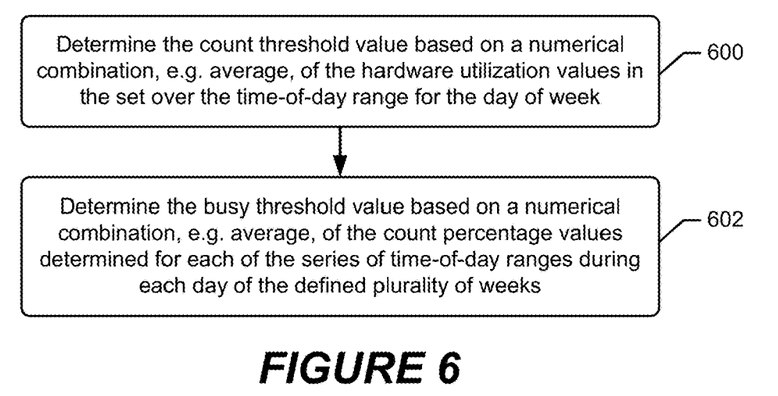

In a further embodiment shown in FIG. 6, the count threshold value is determined (block 600) based on a numerical combination of the hardware utilization values in the set over the time-of-day range for the day of week. In one embodiment, the count threshold value is determined based on a numerical average of the hardware utilization values in the set.

The resource management computer node 150 determines (block 514) a count percentage value based on a ratio of the count value to a sum of count values determined for the same day of week, and compares (Block 516) the count percentage value to a busy threshold value. Responsive to if the count percentage value is determined to exceed the busy threshold value, the resource management computer node 150 sets (block 518) a busy indicator object, e.g., by storing a defined value, at a location in a resource utilization data structure having a defined correspondence to the time-of-day range. The resource management computer node 150 controls (block 520) reservation of hardware resources for operational use by the software application during at least the time-of-day range responsive to whether the busy indicator object has been set at the location in the resource utilization data structure.

The resource management computer node 150 may operate to constrain (block 522) the software application operating using the hardware resources that are reserved. For example, the node 150 may reserve (block 520) a defined number of data servers for processing software application, and responsively perform the constraint (block 522) by controlling deployment (e.g., initiating downloading to the hardware resource and execution thereon) of the software application to only those data servers for execution. The node 150 may reserve (block 520) a level of processor utilization, a level of network communication utilization, a defined amount of volatile memory space, and/or a defined amount of nonvolatile storage space, for use by the software application during execution, and can constrain (block 522) execution of the software application so that it does not utilize more than the reserved level of processor utilization, the reserved level of network communication utilization, the reserved amount of volatile memory space, and/or the reserved amount of nonvolatile storage space.

The resource management computer node 150 may perform reservation operations (block 520) and/or the constraining operations (block 522) by communicating commands to the host operating system 112, the virtual hypervisor 110, and/or the operating systems 130 within the group guest virtual machines 104 shown in FIG. 2, one or more of which is configured to monitor and constrain run-time utilization of the hardware resources 112 by the applications 106-108.

In one illustrative embodiment, the operation for controlling (block 520) reservation of hardware resources includes, reserving a defined plural number of computer servers for use by the software application during at least the time-of-day range while precluding other software applications from using the defined plural number of computer servers that are reserved responsive to determining that the busy indicator object has been set at the location in the resource utilization data structure. The corresponding operations for constraining (block 522) the software application to operating using the hardware resources that are reserved can include running the software application on the defined plural number of computer servers that are reserved during at least the time-of-day range.

Some of the operations of blocks 502-522 have been explained in the context of using hardware utilization values measure for a single software application to control reservation of hardware resources for operational use by the software application. However, these operations can be repeated for any non-zero number of software applications which are using any non-zero number of hardware resources of the computer system.

Referring to block 500, the resource management computer node 150 can repeat, for each of a series of time-of-day ranges (e.g., each hour) during each day (e.g., Monday) of a week, and can furthermore repeat for a defined plurality of weeks, the operations for: 1) determining (block 512) a count value; 2) determining (Block 514) a count percentage; 3) the comparing (block 516) the count percentage value to a busy threshold value; and 4) responsive to if the count percentage value is determined to exceed the busy threshold value, the setting (block 518) a busy indicator object at a location in a resource utilization data structure having a defined correspondence to the time-of-day range. The reservation of hardware resources for operational use by the software application is then controlled (block 520) based on whether the busy indicator objects have been set at locations in the resource utilization data structure for at least a threshold number of the time-of-day ranges. In this manner, for each of the plurality of different time of day ranges the node 150 can selectively set a busy indicator object at the corresponding location in the resource utilization data structure for that time of day range.

Different locations in the resource utilization data structure where busy indicator objects can be selectively set may be programmatically defined to correspond to, for example, different minutes of an hour, different hours of the day, different days of the week, different weeks of the year, and/or different holidays in a year. The resource management computer node 150 can thereby selectively set the busy indicators based on hardware utilization values tracked over the corresponding time increment (e.g., hour of the day, day of the week, etc.) and control its reservation of hardware resources for operational use by a software application within that time increment.

The node 150 may process hardware utilization values measured in a plurality of the time-of-day ranges to determine how it shall control reservation of the hardware resources. In one embodiment, the reservation of hardware resources for operational use by the software application is controlled (block 520) based on whether the busy indicator objects have been set at locations in the resource utilization data structure for at least the threshold number of the time-of-day ranges within at least a threshold number of the days of the week.

In the embodiment shown in FIG. 6, the resource management computer node 150 determines (block 602) the busy threshold value based on a numerical combination of the count percentage values determined for each of the series of time-of-day ranges during each day (e.g., Monday) of the defined plurality of weeks. The busy threshold value may be determined based on a numerical average of the count percentage values determined for each of the series of time-of-day ranges during each day of the defined plurality of weeks.

Some embodiments have been described in the context of obtaining hardware utilization values which have been measured for a single hardware resource of the computer system being used by software application. However, the hardware utilization values may be obtained for measurements on each of a plurality of different hardware resources of the computer system which may be used by the same or a plurality of software applications. Thus, in some embodiments, the resource management computer node 150 obtains (block 502) hardware utilization values measured for a particular software resource and correspondingly controls (block 520) reservation hardware resources for operational use by that software application. In some other embodiments, the hardware utilization values are measured for a plurality of software resources that may or may not be identified to the node 150, such as by their respective unique application serial number, application version number, application type, application owner, and/or other application characteristics that can be defined or otherwise measured.

For example, with continued reference to FIG. 5, the resource management computer node 150 can obtain (block 502) hardware utilization values measured for a plurality of other hardware resources of the computer system being used by the software application. For each of the other hardware resources and for another set of the hardware utilization values that were measured for the other hardware resource during the same time-of-day range, the node 150 can repeat operations for: 1) determining (block 512) a count value indicating a number of times the hardware utilization values in the another set exceed the count threshold value; 2) determining (block 514) a count percentage value based on a ratio of the count value to a sum of count values determined for the same day of week; 3) comparing the count percentage value to the busy threshold value; and 4) responsive to if the count percentage value is determined to exceed the busy threshold value, the setting (block 518) a busy indicator object at another location in the resource utilization data structure having a defined correspondence to the time-of-day range and the other hardware resource. The node 150 can then control (block 520) reservation of hardware resources for operational use by the software application during at least the time-of-day range responsive to whether the busy indicator objects have been set at the locations in the resource utilization data structure, and constrain (block 522) the software application operating using the hardware resources that are reserved.

These and further operations are explained in more detail by way of the following example. The resource management computer node 150 obtains CPU utilization values for a server over a 6 month period that includes August. On a Monday during that period, e.g., August 8th, between 9 AM and 10 AM the CPU utilization is 25 (e.g., 25%), between 10 AM and 11 AM the CPU utilization is 35, and between 11 AM and 12 PM the CPU utilization is 40. The average utilization for these and other hours of that day is determined by the node 150 to be 20 (based on other utilization values not presented here). Assuming a parameter of 50% defines the percentage by which the utilization value for an hour must exceed the average value in order for the node 150 to consider that hour to be a busy hour, the count threshold value is then determined to be 30 (i.e., the average of 20 plus 50%, or 20+10). Assuming the count value for each hour on Monday was last initialized to 0 and has none have yet been incremented, the node 150 determines (updates) the count values as follows: between 9 AM and 10 AM the count remains 0 (i.e., because 25 CPU util. <30 count threshold value); between 10 AM and 11 AM the count is incremented to 1 (i.e., because 35 >30); and between 11 AM and 12 PM the count is incremented to 1 (i.e., because 40 >30).

On another Monday, e.g., August 1st, between 9 AM and 10 AM the CPU utilization is 15, between 10 AM and 11 AM the CPU utilization is 50, and between 11 AM and 12 PM the CPU utilization is 20. The average utilization for these and other hours of that day is also determined to be 25 (based on other utilization values not presented here). The node 150 then updates the count values as follows: between 9 AM and 10 AM the count remains 0 (i.e., because 15<25); between 10 AM and 11 AM the count is incremented to 2 (i.e., because 50 >25); and between 11 AM and 12 PM the count remains 1 (i.e., because 20 >25).

The node 150 repeats this process to selectively increment the count values for other hourly intervals for each Monday during the 6 month period, and similarly repeats these operations to generate count values for all hours of each other day of the week (i.e., Tuesday-Sunday) during the 6 month period.

Then for each hourly timeframe (e.g., between 9 AM and 10 AM) on Mondays during the 6 month period, the node 150 determines a count percentage value based on a ratio of the count value for that hour and a sum of the count values determined for all hours on Monday. If the count percentage value exceeds a busy threshold value the node 150 marks that hourly timeframe (e.g., between 9 AM and 10 AM) as "busy" by setting a busy indicator object in the data structure corresponding to that hourly timeframe and day of week (e.g., Monday). The node 150 repeats this process to selectively set busy indicator objects for each of the hourly timeframes for each of the other days of the week (i.e., Tuesday-Sunday).

Some further embodiments are directed to operations for determining the count percentage value that can provide improved efficiency of control over what hardware resources are reserved for operational use by a software application during the time-of-day range. Improved control may result in fewer instances of an excessive number of hardware resources being reserved for use by the software application while also satisfying a requirement that hardware utilization values for the reserved hardware resources satisfy defined performance metrics, such as any one or more of: 1) providing a defined average processor utilization and/or avoiding the processor utilization exceeding a defined threshold among the reserved hardware resources while processing the software application; 2) providing a defined average communication network utilization and/or avoiding the communication network utilization exceeding a defined threshold among the reserved hardware resources while processing the software application; 3) providing a defined average volatile memory space utilization and/or or avoiding the volatile memory space utilization exceeding a defined threshold among the reserved hardware resources while processing the software application; and/or 4) providing a defined average non-volatile mass memory space utilization and/or or avoiding the non-volatile mass memory utilization exceeding a defined threshold among the reserved hardware resources while processing the software application.

Figure 7:
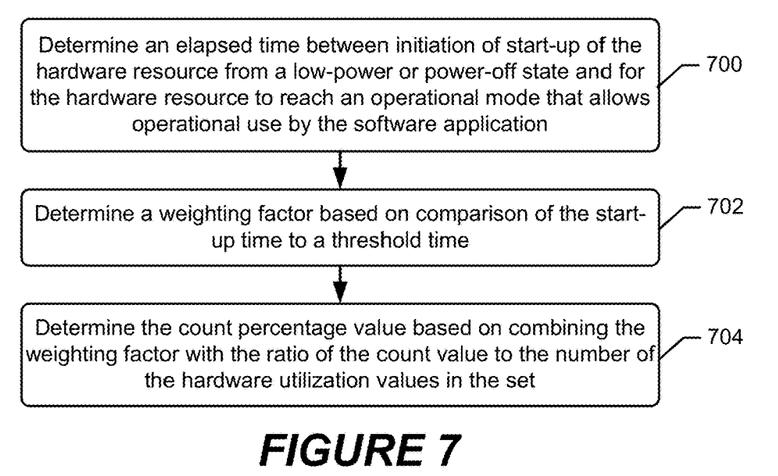

In one embodiment, the count percentage value is determined based on how quickly a hardware resource can be started up from a low-power or power-off state, e.g., booted-up from a power-off state and/or reinitialized with application processing state parameters, to be available to load and execute a software application from memory (e.g., the non-volatile mass memory 122 of FIG. 3), such as to operate to receive and respond to messages from the electronic devices 170 of FIG. 3. In the embodiment of FIG. 7, the resource management computer node 150 determines (block 700) an elapsed time between initiation of start-up of the hardware resource from a low-power or power-off state and for the hardware resource to reach an operational mode that allows operational use by the software application, and determines (block 702) a weighting factor based on comparison of the start-up time to a threshold time. The count percentage value is then determined (block 704) based on combining the weighting factor with the ratio of the count value to the sum of count values determined for the same day of week.

In a further embodiment, a larger weighting factor is used responsive to the elapsed time exceeding a defined threshold so that a greater number of hardware resources will be reserved given a same set of hardware utilization values, when the hardware resource has an excessive elapsed time for starting-up. These operations can reduce or avoid occurrence of the software application having insufficient hardware resources to perform at an acceptable performance level and/or operationally failing for an excessive elapsed time while further deployment and associated start-up of the hardware resource is occurring after being triggered by insufficient resource availability and/or application performance level.

Figure 8:
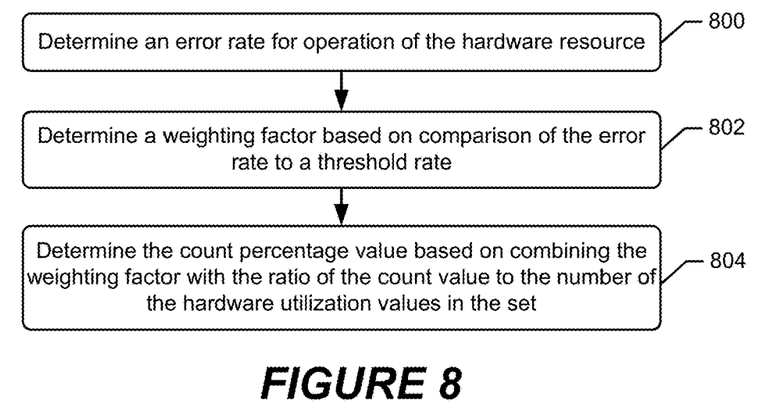

In another embodiment the count percentage value is determined based on error rate for operation of the hardware resource. Referring to FIG. 8, the resource management computer node 150 determines (block 800) an error rate for operation of the hardware resource. The node 150 then determines (block 802) a weighting factor based on comparison of the error rate to a threshold rate, and determines (block 804) the count percentage value based on combining the weighting factor with the ratio of the count value to the sum of count values determined for the same day of week.

In a further embodiment, a larger weighting factor is used responsive to the error rate exceeding a defined threshold so that a greater number of hardware resources will be reserved given a same set of hardware utilization values, when the hardware resource has an excessive error rate. Because these operations can relatively increase the amount of hardware resources allocated when the error rate is excessive, these operations can reduce or avoid occurrence of the software application having insufficient hardware resources to perform at an acceptable level and/or operationally fail for an excessive elapsed time when the excessive error rate would trigger further deployment and associated start-up of the hardware resource.

Figure 9:
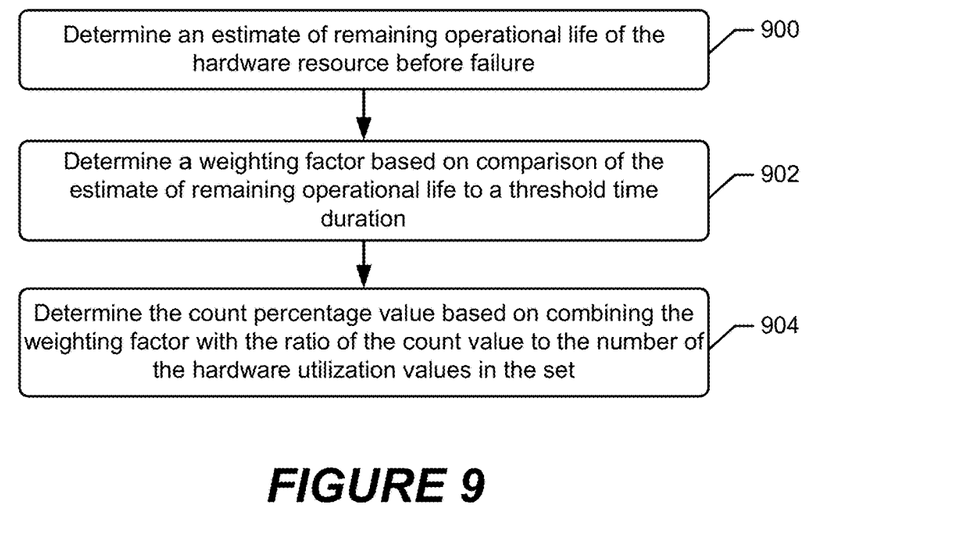

In another embodiment, the busy threshold value is determined based on how quickly a hardware resource can be started up from a low-power or power-off state, e.g., booted-up from a power-off state and/or reinitialized with application processing state parameters, to be available to load and execute a software application from memory, such as to receive and respond to messages from the electronic devices 170 of FIG. 3. In the embodiment of FIG. 9, the resource management computer node 150 determines (block 900) an elapsed time between initiation of start-up of the hardware resource from a low-power or power-off state and for the hardware resource to reach an operational mode that allows operational use by the software application. The node 150 decreases (block 902) the busy threshold value if the elapsed time exceeds a threshold time. In contrast, the node 150 increases (block 904) the busy threshold value if the error rate does not exceed the threshold rate. These operations can reduce or avoid occurrence the software application having insufficient hardware resources to perform at an acceptable level and/or operationally fail for an excessive elapsed time while further deployment and associated start-up of the hardware resource is occurring after being triggered by insufficient resource availability.

Figure 10:
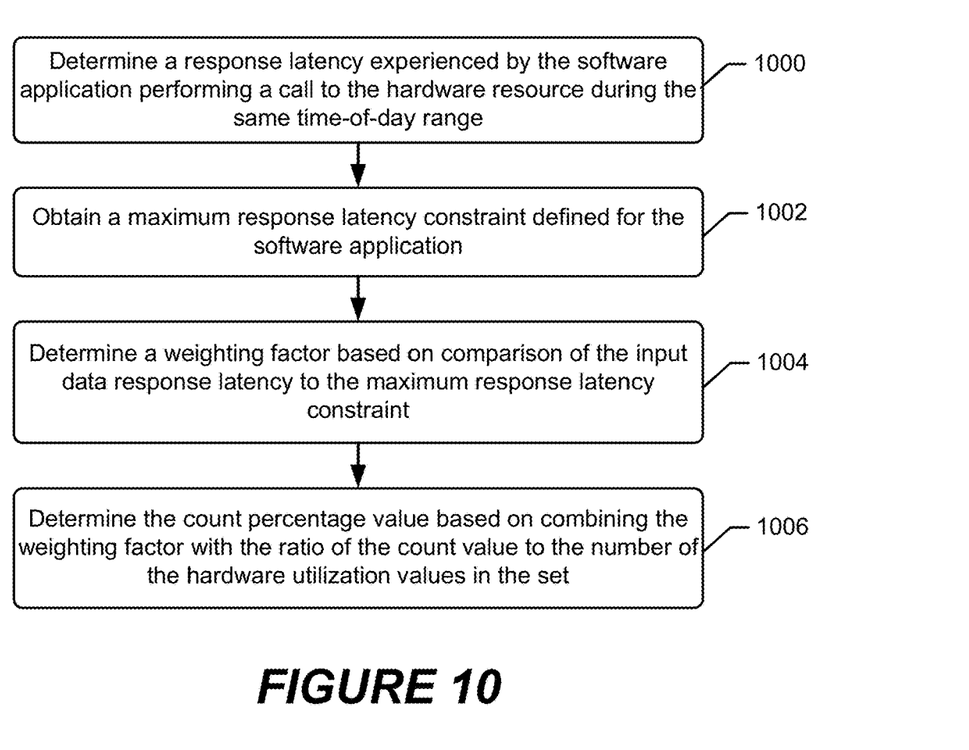

In another embodiment, the count percentage value is determined based on a response latency experienced by the software application performing a call to the hardware resource during the same time-of-day range. In the embodiment of FIG. 10, the resource management computer node 150 determines (block 1000) a response latency experienced by the software application performing a call to the hardware resource during the same time-of-day range. The node 150 obtains (block 1002) a maximum response latency constraint defined for the software application, and determines (block 1004) a weighting factor based on comparison of the input data response latency to the maximum response latency constraint. The count percentage value is then determined (block 1006) based on combining the weighting factor with the ratio of the count value to the sum of count values determined for the same day of week.

In a further embodiment, a larger weighting factor is used responsive to the response latency exceeding a defined threshold so that a greater number of hardware resources will be reserved given a same set of hardware utilization values, when the hardware resource has an excessive response latency. These operations can reduce or avoid occurrence the software application having insufficient hardware resources to perform at an acceptable level and/or operationally fail for an excessive elapsed time when the excessive response latency would trigger further deployment and associated start-up of the hardware resource.

Figure 11:
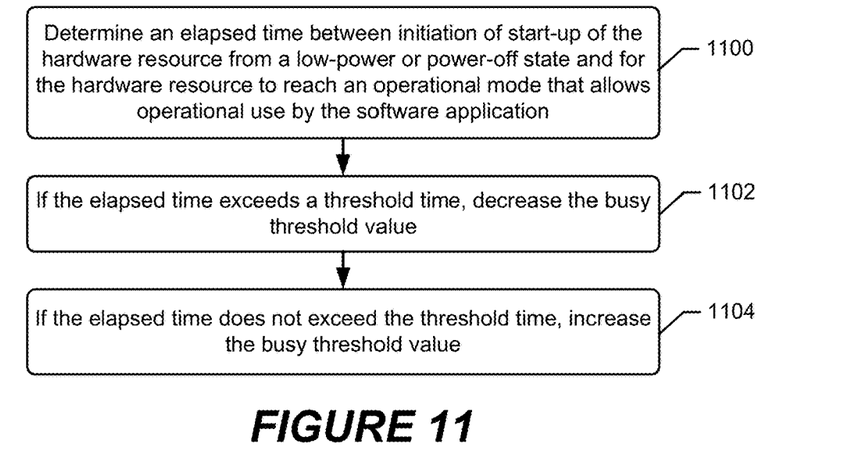

In another embodiment, the busy threshold value is adjusted based on how quickly a hardware resource can be started up from a low-power or power-off state, e.g., booted-up from a power-off state and/or reinitialized with application processing state parameters, to be available to load and execute a software application from memory, such as to receive and respond to messages from the electronic devices 170 of FIG. 3. In the embodiment of FIG. 11, the resource management computer node 150 determines (block 1100) an elapsed time between initiation of start-up of the hardware resource from a low-power or power-off state and for the hardware resource to reach an operational mode that allows operational use by the software application. The node 150 responsively decreases (block 1102) the busy threshold value if the elapsed time exceeds a threshold time. In contrast, the node 150 responsively increases (block 1104) the busy threshold value if the elapsed time does not exceed the threshold time. These operations can reduce or avoid occurrence the software application having insufficient hardware resources to perform at an acceptable level and/or operationally fail for an excessive elapsed time while further deployment and associated start-up of the hardware resource is occurring after being triggered by insufficient resource availability.

Figure 12:
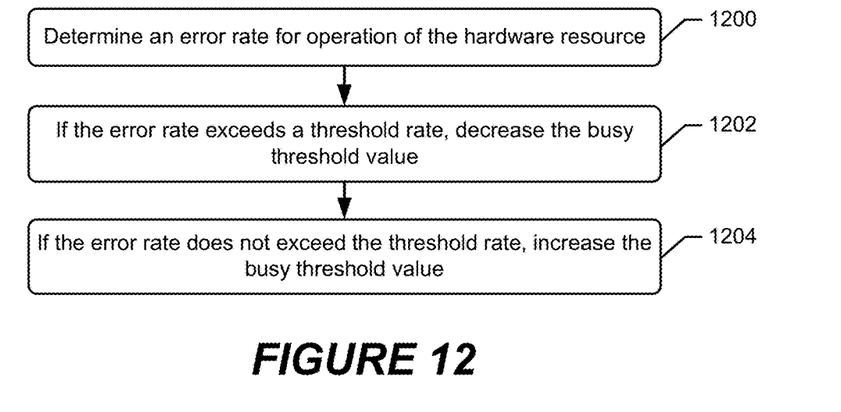

In another embodiment, the busy threshold value is adjusted based on error rate for operation of the hardware resource. In the embodiment of FIG. 12, the resource management computer node 150 determines (block 1200) an error rate for operation of the hardware resource. The node 150 responsively decreases (block 1202) the busy threshold value if the error rate exceeds a threshold rate. In contrast, the node 150 responsively increases (block 1204) the busy threshold value if the error rate does not exceed the threshold rate. Because these operations can relatively increase the amount of hardware resources allocated when the error rate is excessive, these operations can reduce or avoid occurrence of the software application having insufficient hardware resources to perform at an acceptable level and/or operationally fail for an excessive elapsed time when the excessive error rate would trigger further deployment and associated start-up of the hardware resource.

Figure 13:
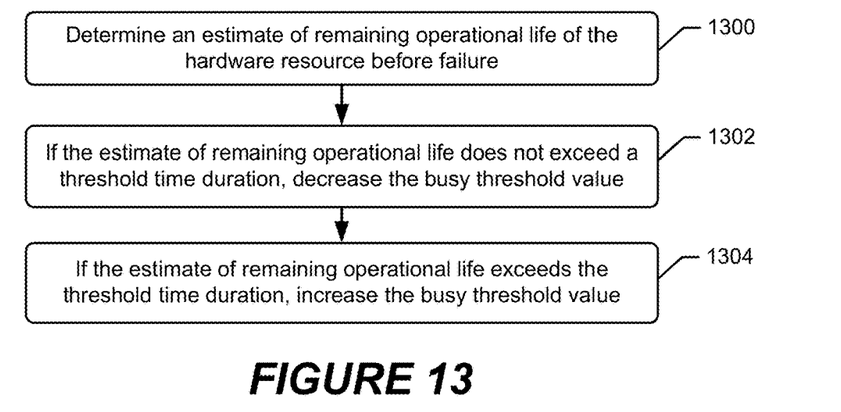

In another embodiment, the busy threshold value is adjusted based on an estimate of remaining operational life of the hardware resource before failure. In the embodiment of FIG. 13, the resource management computer node 150 determines (block 1300) an estimate of remaining operational life of the hardware resource before failure. The node 150 responsively decreases (block 1302) the busy threshold value if the estimate of remaining operational life does not exceed a threshold time duration. In contrast, the node 150 responsively increases (block 1304) the busy threshold value if the estimate of remaining operational life exceeds the threshold time duration. Because these operations can relatively increase the amount of hardware resources allocated when the remaining operational life does not exceed a threshold time duration, these operations can reduce or avoid occurrence of the software application having insufficient hardware resources to perform at an acceptable level and/or operationally fail for an excessive elapsed time when an excessive risk of anticipated hardware failure would trigger further deployment and associated start-up of the hardware resource.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method performed by a resource management computer node comprising:
obtaining hardware utilization values measured for a hardware resource of a computer system being used by a software application;
for a set of the hardware utilization values that were measured during a same time-of-day range on a same day of week,
determining a count value indicating a number of times the hardware utilization values in the set exceed a count threshold value,
determining a count percentage value based on a ratio of the count value to a sum of count values determined for the same day of week,
comparing the count percentage value to a busy threshold value, and
responsive to if the count percentage value is determined to exceed the busy threshold value,
setting a busy indicator object at a location in a resource utilization data structure having a defined correspondence to the time-of-day range;
controlling reservation of hardware resources for operational use by the software application during at least the time-of-day range responsive to whether the busy indicator object has been set at the location in the resource utilization data structure; and
subsequent to the controlling reservation of hardware resources, running the software application on the reserved hardware resources during at least the time-of-day range.

2. The method of claim 1, wherein:
the controlling reservation of hardware resources comprises,
reserving a defined plural number of computer servers for use by the software application during at least the time-of-day range while precluding other software applications from using the defined plural number of computer servers that are reserved responsive to determining that the busy indicator object has been set at the location in the resource utilization data structure; and
the running the software application on the reserved hardware resources during at least the time-of-day range comprises,
running the software application on the defined plural number of computer servers that are reserved during at least the time-of-day range while precluding other software applications from using the defined plural number of computer servers.

3. The method of claim 1, wherein:
the hardware utilization values are measured as at least one of processor utilization, non-volatile memory device storage space utilization, and data network communication utilization.

4. The method of claim 1, further comprising:
determining the count threshold value based on a numerical combination of the hardware utilization values in the set.

5. The method of claim 4, wherein the count threshold value is determined based on a numerical average of the hardware utilization values in the set.

6. The method of claim 1, further comprising:
repeating for each of a series of time-of-day ranges during each day of a defined plurality of weeks:
the determining a count value;
the determining a count percentage value;
the comparing the count percentage value to a busy threshold value; and
the responsive to if the count percentage value is determined to exceed the busy threshold value, setting a busy indicator object at a location in a resource utilization data structure having a defined correspondence to the time-of-day range; and wherein the reservation of hardware resources for operational use by the software application is controlled based on whether the busy indicator objects have been set at locations in the resource utilization data structure for at least a threshold number of the time-of-day ranges.

7. The method of claim 6, wherein the reservation of hardware resources for operational use by the software application is controlled based on whether the busy indicator objects have been set at locations in the resource utilization data structure for at least the threshold number of the time-of-day ranges within at least a threshold number of the days of the plurality of weeks.

8. The method of claim 6, further comprising:
determining the busy threshold value based on a numerical combination of the count percentage values determined for each of the series of time-of-day ranges during each day of the plurality of weeks.

9. The method of claim 1, further comprising:
obtaining hardware utilization values measured for a plurality of other hardware resources of the computer system being used by the software application;
repeating for each of the other hardware resources and for another set of the hardware utilization values that were measured for the other hardware resource during the same time-of-day range on the same day of week,
the determining a count value indicating a number of times the hardware utilization values in the another set exceed the count threshold value,
the determining a count percentage value based on a ratio of the count value to a sum of count values determined for the same day of week,
the comparing the count percentage value to the busy threshold value, and
the responsive to if the count percentage value is determined to exceed the busy threshold value,
setting a busy indicator object at another location in the resource utilization data structure having a defined correspondence to the time-of-day range and the other hardware resource; and
controlling reservation of hardware resources for operational use by the software application during at least the time-of-day range responsive to whether the busy indicator objects have been set at the locations in the resource utilization data structure.

10. The method of claim 1, further comprising:
determining an elapsed time between initiation of start-up of the hardware resource from a low-power or power-off state and for the hardware resource to reach an operational mode that allows operational use by the software application; and
determining a weighting factor based on comparison of the start-up time to a threshold time,
wherein the count percentage value is determined based on combining the weighting factor with the ratio of the count value to the sum of count values determined for the same day of week.

11. The method of claim 1, further comprising:
determining an error rate for operation of the hardware resource; and
determining a weighting factor based on comparison of the error rate to a threshold rate,
wherein the count percentage value is determined based on combining the weighting factor with the ratio of the count value to the sum of count values determined for the same day of week.

12. The method of claim 1, further comprising:
determining an estimate of remaining operational life of the hardware resource before failure; and
determining a weighting factor based on comparison of the estimate of remaining operational life to a threshold time duration,
wherein the count percentage value is determined based on combining the weighting factor with the ratio of the count value to the sum of count values determined for the same day of week.

13. The method of claim 1, further comprising:
determining an elapsed time between initiation of start-up of the hardware resource from a low-power or power-off state and for the hardware resource to reach an operational mode that allows operational use by the software application;
decreasing the busy threshold value if the elapsed time exceeds a threshold time; and
increasing the busy threshold value if the elapsed time does not exceed the threshold time.

14. The method of claim 1, further comprising:
determining an error rate for operation of the hardware resource; and
decreasing the busy threshold value if the error rate exceeds a threshold rate; and
increasing the busy threshold value if the error rate does not exceed the threshold rate.

15. The method of claim 1, further comprising:
determining an estimate of remaining operational life of the hardware resource before failure;
decreasing the busy threshold value if the estimate of remaining operational life does not exceed a threshold time duration; and
increasing the busy threshold value if the estimate of remaining operational life exceeds the threshold time duration.

16. The method of claim 1, further comprising:
determining a response latency experienced by the software application performing a call to the hardware resource during the same time-of-day range;
obtaining a maximum response latency constraint defined for the software application; and
determining a weighting factor based on comparison of the input data response latency to the maximum response latency constraint,
wherein the count percentage value is determined based on combining the weighting factor with the ratio of the count value to the sum of count values determined for the same day of week.

17. A resource management computer node comprising:
a network interface circuit configured to communicate with hardware resources of a computer system;
a processor circuit coupled to the network interface circuit; and
a memory circuit coupled to the processor circuit and storing program code which when executed by the processor circuit causes the processor circuit to perform operations comprising:
obtain hardware utilization values measured for at least one of the hardware resources being used by a software application;

for a set of the hardware utilization values that were measured during a same time-of-day range on a same day of week,
 determining a count value indicating a number of times the hardware utilization values in the set exceed a count threshold value,
 determining a count percentage value based on a ratio of the count value to a sum of count values determined for the same day of week,
 comparing the count percentage value to a busy threshold value,
 responsive to if the count percentage value is determined to exceed the busy threshold value,
  setting a busy indicator object at a location in a resource utilization data structure having a defined correspondence to the time-of-day range; and
 controlling reservation of the hardware resources for operational use by the software application during at least the time-of-day range responsive to whether the busy indicator object has been set at the location in the resource utilization data structure; and
 subsequent to the controlling reservation of hardware resources, running the software application on the reserved hardware resources during at least the time-of-day range.

18. The resource management computer node of claim 17, wherein the operations further comprise:
 obtain hardware utilization values measured for a plurality the hardware resources of the computer system being used by the software application;
 repeating for each of the hardware resources and a set of the hardware utilization values that were measured for the hardware resource during the same time-of-day range on the same day of week,
  the determining a count value indicating a number of times the hardware utilization values in the set exceed the count threshold value, wherein the count threshold value is determined based on a numerical average of the hardware utilization values in the set,
  the determining a count percentage value based on a ratio of the count value to a sum of count values determined for the same day of week,
  the comparing the count percentage value to the busy threshold value, and
  the responsive to if the count percentage value is determined to exceed the busy threshold value,
   setting a busy indicator object at a location in the resource utilization data structure having a defined correspondence to the time-of-day range and the hardware resource; and
 controlling reservation of hardware resources for operational use by the software application during at least the time-of-day range responsive to whether the busy indicator objects have been set at the locations in the resource utilization data structure for at least a threshold number of the time-of-day ranges within at least a threshold number of the days of the week,
 wherein the busy threshold value is determined based on a numerical average of the count percentage values determined for each of the series of time-of-day ranges during each day of the week.

19. The resource management computer node of claim 17, wherein:
 the operations for controlling reservation of hardware resources comprise,
  reserving a defined plural number of computer servers for use by the software application during at least the time-of-day range while precluding other software applications from using the defined plural number of computer servers that are reserved responsive to determining that the busy indicator object has been set at the location in the resource utilization data structure; and
 the operations for running the software application on the reserved hardware resources during at least the time-of-day range comprise,
  running the software application on the defined plural number of computer servers that are reserved during at least the time-of-day range while precluding other software applications from using the defined plural number of computer servers.

* * * * *